United States Patent
Yagi et al.

(10) Patent No.: US 6,623,148 B2
(45) Date of Patent: Sep. 23, 2003

(54) INFRARED LIGHT IRRADIATION LAMP FOR AUTOMOBILE

(75) Inventors: Seiichiro Yagi, Shizuoka (JP); Takashi Inoue, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/118,903

(22) Filed: Apr. 10, 2002

(65) Prior Publication Data
US 2002/0154513 A1 Oct. 24, 2002

(30) Foreign Application Priority Data
Apr. 24, 2001 (JP) ...................................... P.2001-126534

(51) Int. Cl.[7] .................................................. F21V 9/04
(52) U.S. Cl. ....................... 362/510; 362/512; 362/293; 362/214; 362/464
(58) Field of Search ................................. 362/510, 512, 362/293, 214, 513, 280, 464, 465, 466

(56) References Cited

U.S. PATENT DOCUMENTS 5,132,881 A * 7/1992 Wakimizu et al. ........... 362/539
5,243,501 A * 9/1993 Makita et al. ............... 362/510

FOREIGN PATENT DOCUMENTS

JP 2000-036885 A 2/2000
JP 2001-229717 A 8/2001

* cited by examiner

Primary Examiner—Sandra O'Shea
Assistant Examiner—Hargobind S. Sawhney
(74) Attorney, Agent, or Firm—Sughrue Mion, PLLC

(57) ABSTRACT

An infrared light irradiation lamp for an automobile comprises a lighting chamber S formed by a lamp body 12 and a front lens 14, a reflector 16 provided in the lamp body 12, a light source 20 provided ahead of the reflector 16, a cylindrical globe 30 for infrared light formation provided to cover the light source 20 and serving to shield a visible light and to transmit only an infrared light and a globe moving mechanism 70 for moving the globe 30, the globe moving mechanism 70 being capable of switching a lamp function into an infrared light irradiation configuration in which the globe 30 covers the light source and a visible light irradiation configuration in which the globe 30 is moved forward from the light source 20, wherein power regulating means is provided on a power supply path reaching the light source 20 and a power supplied from the light source at time of infrared light irradiation is regulated to be lower than a power supplied from the light source at time of visible light irradiation. The amount of heat generated from the light source 20 covered with the glove 30 is reduced so that the inside of the glove 30 does not have such a high temperature that the infrared ray transmission characteristic of the glove and the lifetime of the light source are not adversely influenced.

10 Claims, 5 Drawing Sheets

TYPICAL VIEW OF IMAGE OF RUNNING SCENE

VIDEO OUTPUT SIGNAL

INFRARED LIGHT IRRADIATION LAMP FOR AUTOMOBILE

BACKGROUND OF THE INVENTION

1. Field of the Invention

The present invention relates to an infrared light irradiation lamp for an automobile which is mounted on an automobile and illuminates a forward portion of a vehicle with an infrared light, and more particularly to an infrared light irradiation lamp for an automobile which has such a structure that an infrared light is formed by a globe for infrared light formation covering a bulb to be a light source and which is shared with a CCD camera having a sensitivity up to a near-infrared.

2. Description of the Related Art

For example, this kind of lamp has such a structure that a visible light source and a reflector are provided in a lighting chamber formed by a lamp body and a front lens, an infrared light transmission globe having a surface coated with an infrared light transmission multilayer film is provided to cover the visible light source, and an infrared light in a light source light which is transmitted through a globe is reflected by the reflector, is transmitted through the front lens and is distributed forward.

An image of an infrared light irradiation region in a forward portion of a vehicle is captured by a CCD camera having a sensitivity up to a near-infrared provided in a front part of an automobile, is processed by an image processing apparatus and is projected onto a monitor screen in a vehicle compartment. A driver can confirm a person, a lane mark and an obstacle over the monitor screen projecting a field of view in the forward part of the vehicle at a great distance.

Moreover, the applicant has proposed, in JP-A-2000-36885, a lamp capable of being alternatively selected into an infrared light irradiation lamp and a headlamp (a main beam irradiation lamp) by switching a configuration (an infrared light irradiation configuration) in which an infrared light transmission globe provided in such a position as to cover a visible light source is movably constituted in an axial direction and the globe is positioned to cover the visible light source so that an infrared light is irradiated, and a configuration (a visible light irradiation configuration, a main beam irradiation configuration of the headlamp) in which the globe is moved forward from the visible light source so that a portion provided around the visible light is released and the visible light is thereby irradiated.

In the JP-A-2000-36885, however, when the lamp is to be used as the infrared light irradiation lamp, a tungsten halogen bulb to be a visible light source is surrounded by the infrared light transmission globe. Therefore, the inside of the globe is filled with heat generated from the bulb so that the inside of the globe has a high temperature. For this reason, there is a problem in that the halogen cycle of the tungsten halogen bulb does not function so that the lifetime of the bulb or the infrared light transmission globe is shortened, for example, blacking is generated to decrease an amount of a light or the infrared light transmission multilayer film of the globe is deteriorated to reduce an infrared cut characteristic.

SUMMARY OF THE INVENTION

The invention has been made in consideration of the problems of the prior art and has an object to provide an infrared light irradiation lamp in which the inside of a globe for infrared light formation at time of infrared light irradiation does not have such a high temperature that the infrared ray transmission characteristic of the globe and the lifetime of a bulb are not adversely influenced.

In order to achieve the object, a first aspect of the invention is directed to an infrared light irradiation lamp for an automobile comprising a lighting chamber formed by a lamp body and a front lens, a reflector provided in the lamp body, a light source provided ahead of the reflector, a cylindrical globe for infrared light formation provided to cover the light source and serving to shield a visible light and to transmit only an infrared light and a globe moving mechanism for moving the globe, the globe moving mechanism being capable of switching a lamp function into an infrared light irradiation configuration in which the globe for infrared light formation covers the light source and a visible light irradiation configuration in which the globe for infrared light formation is moved forward from the light source, wherein power regulating means is provided on a power supply path reaching the light source and a power supplied from the light source in the infrared light irradiation configuration is regulated to be lower than a power supplied from the light source in the visible light irradiation configuration.

In the visible light irradiation configuration, the globe for infrared light formation is provided ahead of the light source and a portion provided around the light source is released. Therefore, there is no possibility that the heat generated from the light source might be radiated into the space of the lighting chamber which is provided around the light source and the globe and the light source themselves might be exposed to a high temperature. On the other hand, in the infrared light irradiation configuration, the globe for infrared light formation is positioned to cover the light source so that the inside of the globe is apt to be filled with the heat generated from the light source. However, since the power regulated by the power regulating means (which is lower than the power to be supplied to the light source in the visible light irradiation configuration) is supplied to the light source, the amount of heat generation in the light source is correspondingly reduced so that the inside of the globe can be prevented from having a high temperature. More specifically, the temperature in the globe does not have such a high temperature that the visible light cut and infrared ray transmission characteristic of the globe and the lifetime of the light source are influenced adversely.

Moreover, it is desirable that the power regulating means should be operated in connection with the switching of the lamp function by the globe moving mechanism. By such a structure, it is not necessary to operate the power regulating means manually.

The light distribution of the lamp includes the case in which a step for light distribution control is not provided on the front lens but the light is controlled and formed by only the reflector in addition to the case in which the light reflected by the reflector is controlled and formed at the step for light distribution control provided on the front lens. It is assumed that the front lens also includes the front lens having no step for light distribution control, that is, a so-called front cover.

A second aspect of the invention is directed to the infrared light irradiation lamp for an automobile according to the first aspect of the invention, wherein a source voltage is directly supplied to the light source in the case in which the power regulating means is not operated and the power regulating means has the lamp function in the infrared light irradiation configuration and drops the power supplied from the light source when the source voltage exceeds a predetermined value.

In the visible light irradiation configuration in which the portion provided around the light source is released so that the globe for infrared light formation and the light source themselves are not exposed to a high temperature, a power having an exact source voltage is supplied to form a main beam in a sufficient amount of a light. On the other hand, in the infrared light irradiation configuration in which there is a possibility that the inside of the globe might be filled with heat to expose the globe and the light source themselves to a high temperature, the amount of heat generation of the light source is not greatly increased if the source voltage does not exceed a predetermined value (for example, 12V). In the same manner as the case of the visible light irradiation configuration, therefore, a power having an exact source voltage is supplied to the light source to form an infrared beam in a sufficient amount of a light. Consequently, the detection of a night forward field-of-view detecting system using a CCD camera can easily be carried out. If the source voltage exceeds the predetermined value (for example, 12V), a power (for example, a power of 12V) regulated by the power regulating means is supplied to the light source such that the amount of heat generation in the light source is not increased. Thus, a temperature in the globe can be prevented from being increased.

A third aspect of the invention is directed to the infrared light irradiation lamp for an automobile according to the first or second aspect of the invention, wherein the globe for infrared light formation in the infrared light irradiation configuration has a rear end provided apart from the reflector.

In the infrared light irradiation configuration, an air convection is generated across the inside and outside of the globe for infrared light formation through a clearance provided between the reflector and the rear end of the globe for infrared light formation. Thus, the heat in the globe is radiated out of the globe.

With such a structure that a light source holding member (a bulb holder) formed of metal which has an extended portion extended into the globe for infrared light formation and a radiation fin extended to the back of the reflector is provided between the light source attachment hole (bulb insertion hole) of the reflector and the mouth piece of the light source (bulb), moreover, heat generated by turning on the light source is transmitted to the light source holding member so that the heat is radiated from the radiation fin into the space provided on the back of the reflector (for example, in the lighting chamber) and the globe for infrared light formation is not thereby filled with the heat.

DESCRIPTION OF THE PREFERRED EMBODIMENTS

Next, an embodiment of the invention will be described based on an example.

Figure 1:
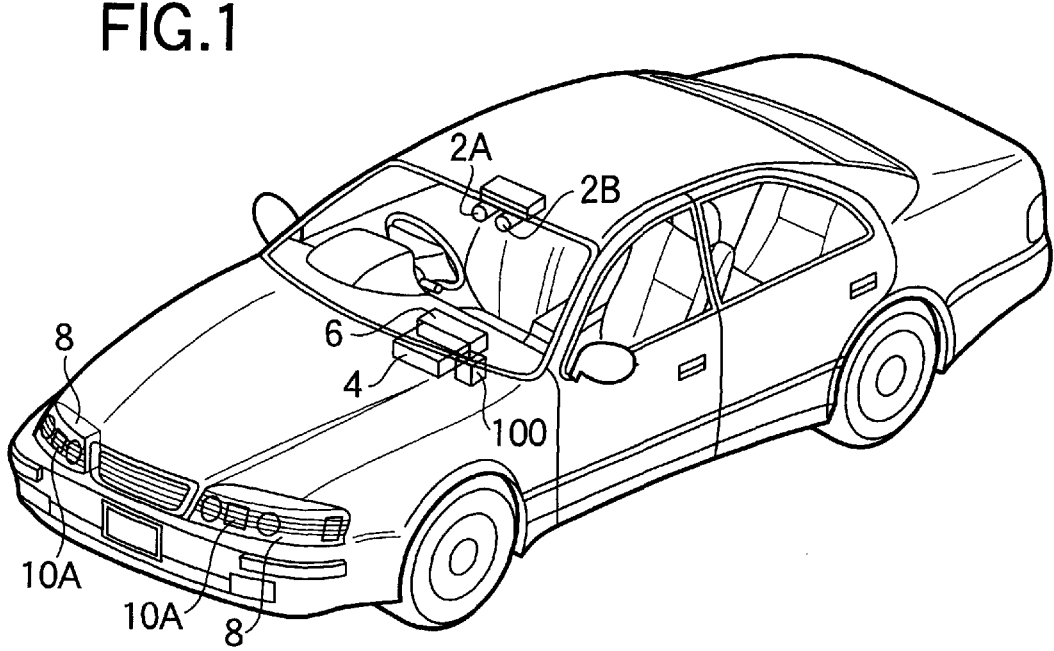
FIG. 1 is a view showing the whole structure of a night forward field-of-view detecting system using an infrared light irradiation lamp according to a first embodiment of the invention.
Figure 2A:
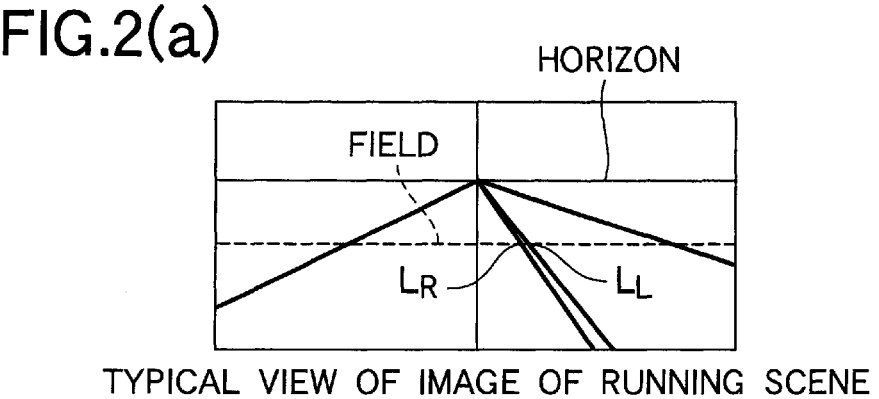
FIG. 2(a) is a typical diagram showing an image in a forward part of a vehicle.
Figure 2B:
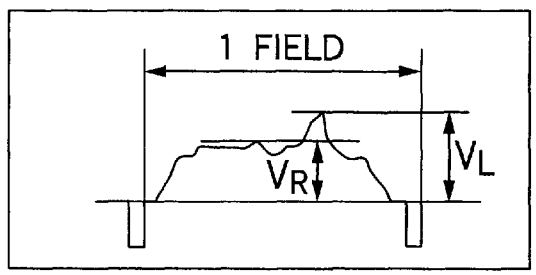
FIG. 2(b) is a diagram showing a picture output signal fetched in an image processing analyzer.
Figure 3:
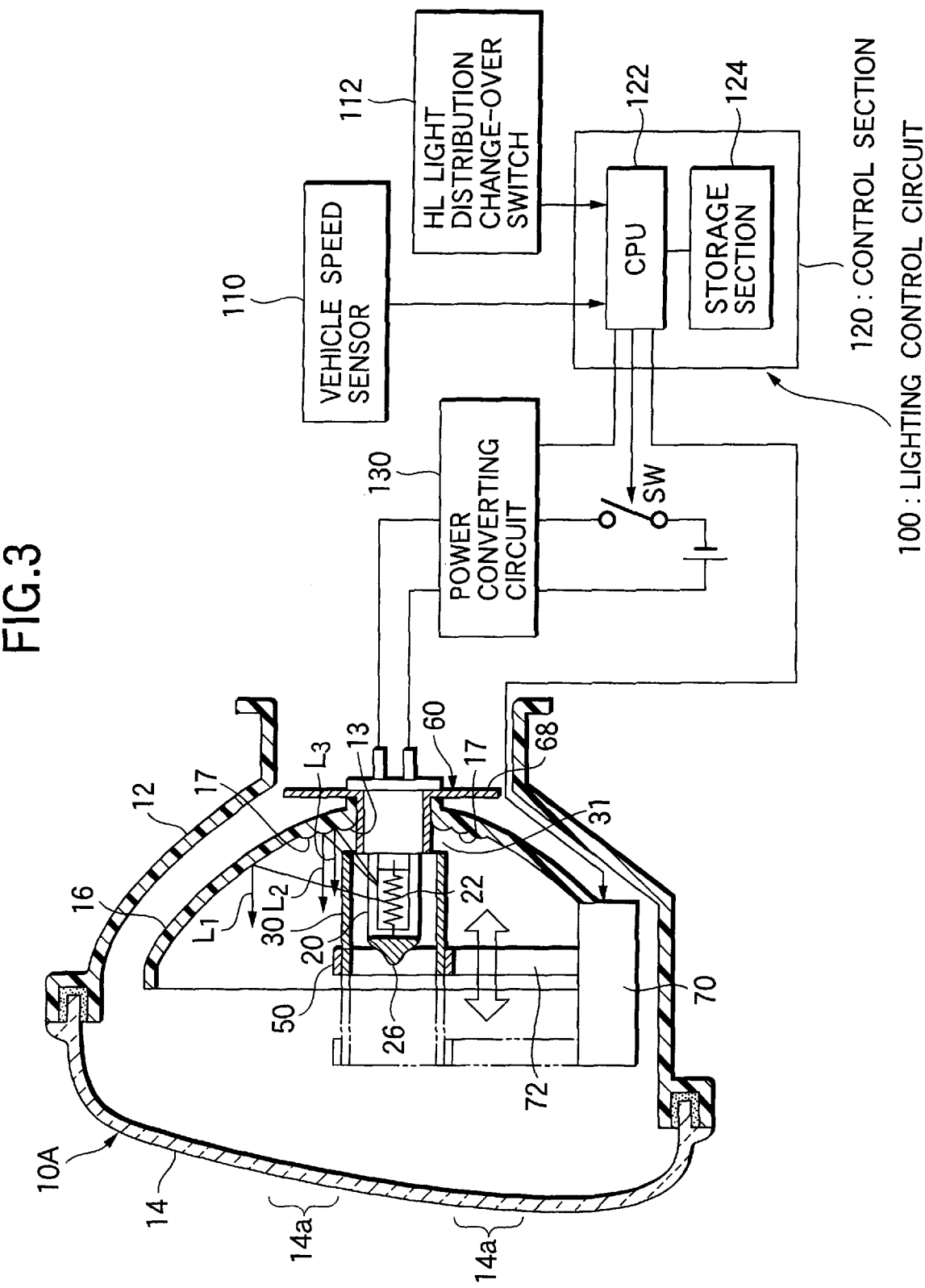
FIG. 3 is a longitudinal sectional view showing the infrared light irradiation lamp according to the first embodiment of the invention.
Figure 4A:
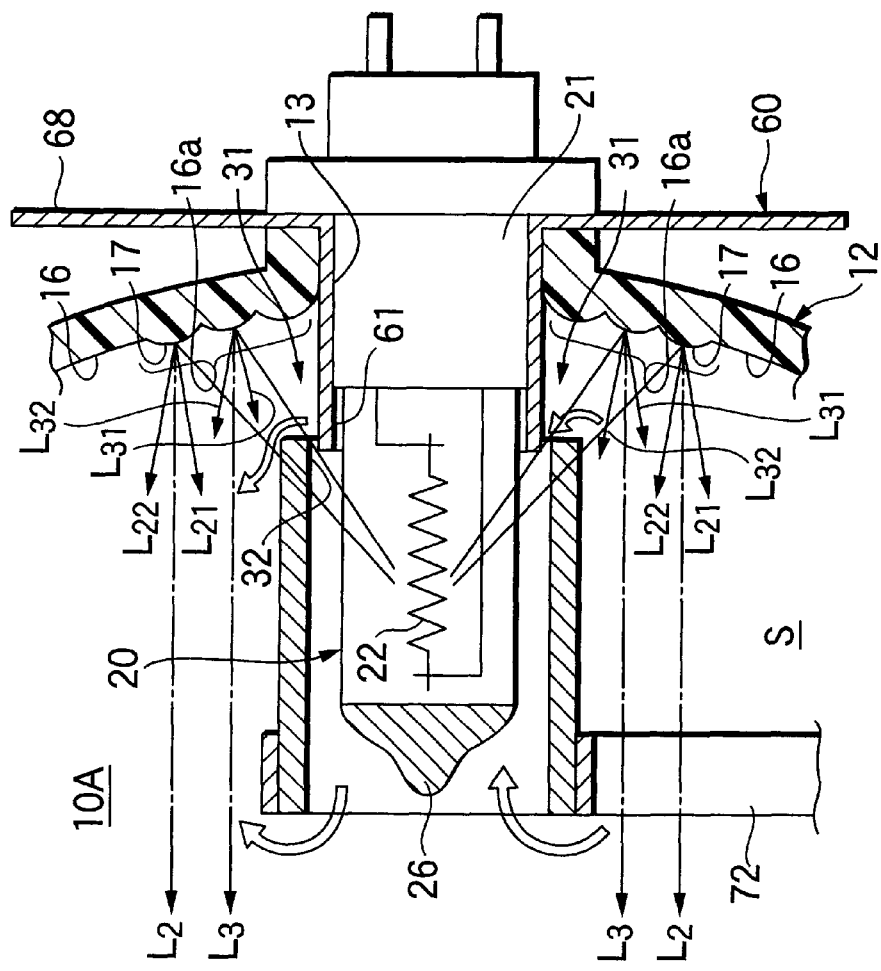
FIG. 4(a) is an enlarged longitudinal sectional view showing a peripheral region of a bulb to be the main part of the infrared light irradiation lamp.
Figure 4B:
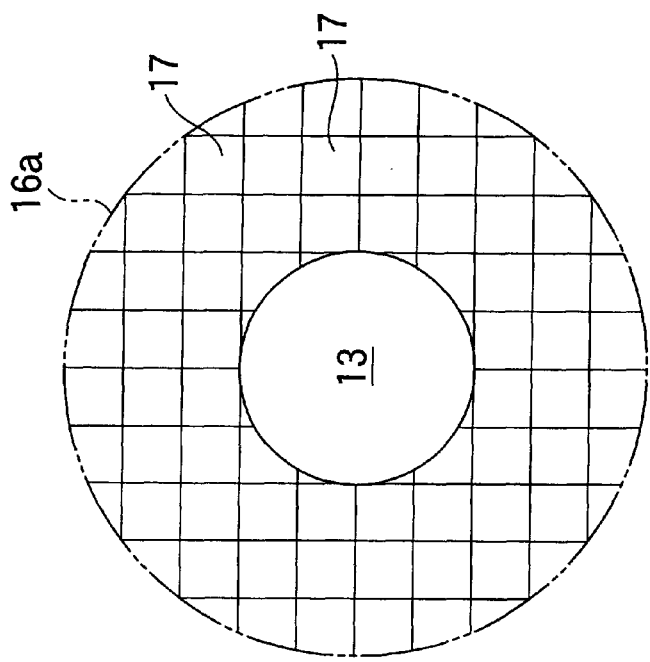
FIG. 4(b) is a front view showing a peripheral region of a bulb insertion attachment hole in a reflector.
Figure 5A:
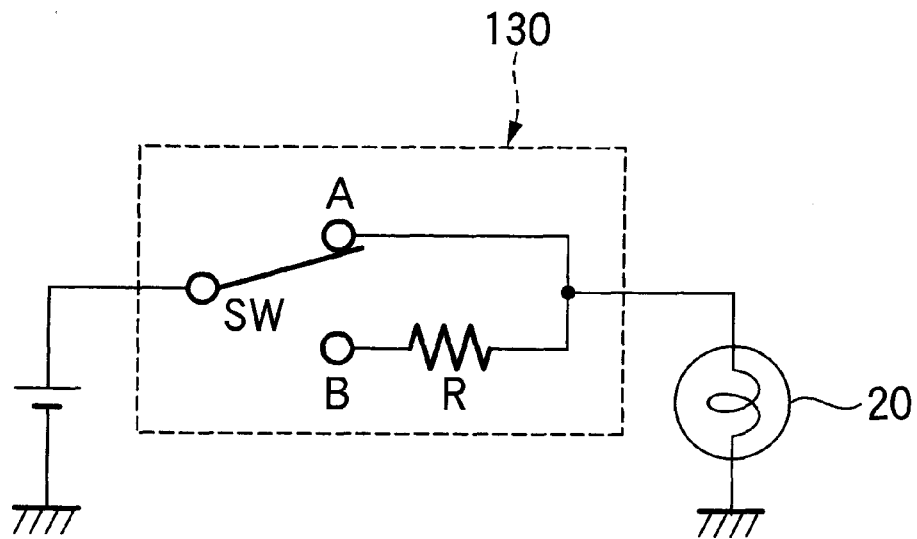
FIG. 5(a) is a diagram showing an example of the structure of a power converting circuit.
Figure 5B:
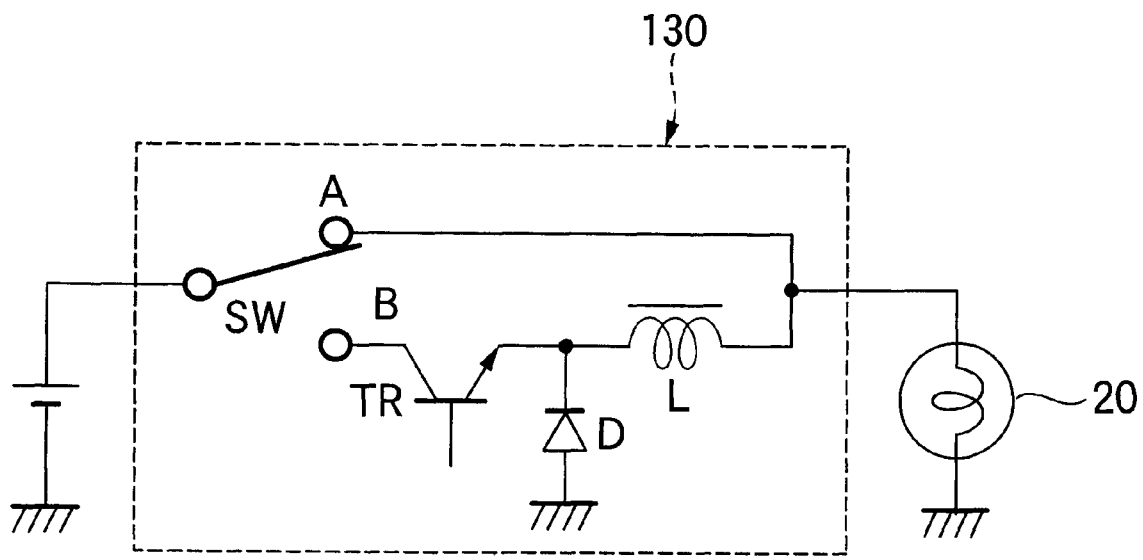
FIG. 5(b) is a diagram showing another example of the structure of the power converting circuit.
Figure 6:
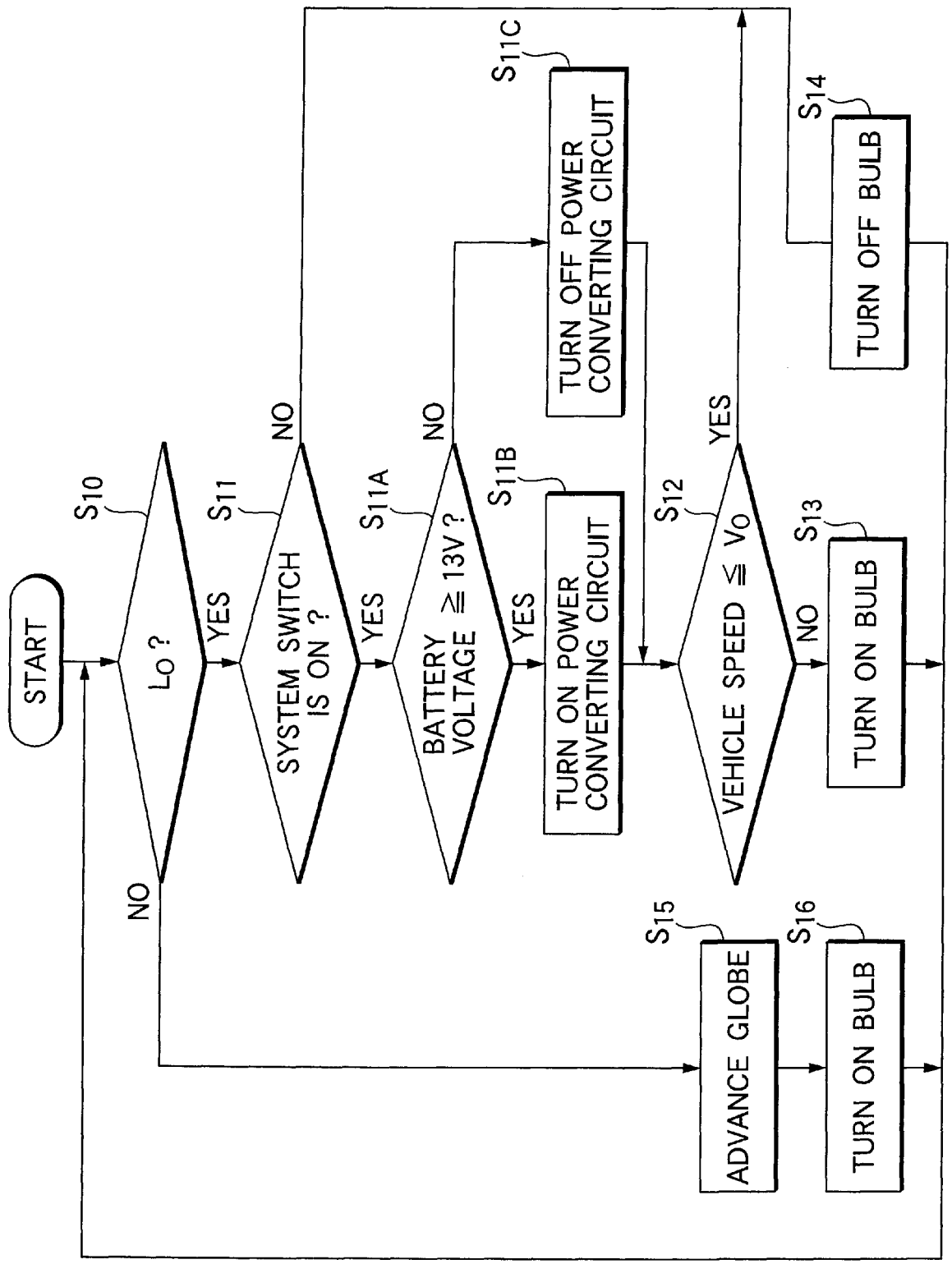
FIG. 6 is a flow chart showing a processing flow of a CPU in a control portion for controlling the turn on of the infrared light irradiation lamp.

FIGS. 1 to 5 show an example in which the invention is applied to a night forward field-of-view detecting system, and FIG. 1 is a view showing the whole structure of a night forward field-of-view detecting system using an infrared light irradiation lamp according to a first embodiment of the invention, FIG. 2(a) is a typical diagram showing an image in a forward part of a vehicle which appears on a display, FIG. 2(b) is a diagram showing a picture output signal fetched in an image processing analyzer, FIG. 3 is a longitudinal sectional view showing the infrared light irradiation lamp, FIG. 4(a) is an enlarged longitudinal sectional view showing a peripheral region of a bulb to be the main part of the infrared light irradiation lamp, FIG. 4(b) is an enlarged front view showing a peripheral region of a bulb insertion attachment hole in a reflector, FIG. 5 is a diagram showing the structure of a power converting circuit and FIG. 6 is a flow chart showing a processing flow of a CPU in a control portion for controlling the turn on of the infrared light irradiation lamp.

As shown in FIG. 1, the night forward field-of-view detecting system is mainly constituted by a headlamp 8 and an infrared light irradiation lamp 10A which are provided in the front part of a vehicle, a pair of CCD cameras 2A and 2B provided side by side on the upper part in a vehicle compartment and serving to capture a field of view in the forward portion of the vehicle, an image processing analyzer 4 for analyzing images captured by the CCD cameras 2A and 2B, and a head up display (HUD) 6 for displaying data analyzed by the image processing analyzer 4.

The CCD camera for capturing the forward region of the vehicle is constituted by the visible light CCD camera 2A having a sensitivity in a visible light area and the infrared light CCD camera 2B having a sensitivity up to an infrared light area, and is of a stereo camera type capable of measuring a distance to a forward view object. The images captured by both of the CCD cameras 2A and 2B are transferred to the image processing analyzer 4 and two pictures are compared with each other.

More specifically, a picture output voltage of each scanning line field) is fetched from a picture (image) shown in FIG. 2(a) which is captured by the CCD camera and is stored as data on a whole screen (or a main part) in consideration of Y characteristics (photoelectric conversion characteristics) of both cameras 2A and 2B. The correction is required for adjusting the sensitivities of the cameras 2A and 2B to obtain almost the same picture outputs in the cameras 2A and 2B for an object on the road. By taking a difference between the two images and fetching the difference which is equal to or greater than a threshold from the pictures, it is possible to obtain pictures of a pedestrian, an obstacle and a lane mark at a great distance which cannot be seen. By carrying out an edge processing or pattern recognition based on the picture for the difference, it is possible to easily recognize the pedestrian, the obstacle and the lane mark.

The pictures of the pedestrian, the obstacle and the lane mark can be given to a driver through the head up display (HUD) 6 and the features of an object on a road (the pedestrian, the obstacle and the lane mark) can be decided by shape recognition and can be reported to the driver in a voice.

The CCD camera for capturing the forward region of the vehicle may be constituted by one CCD camera having a sensitivity in a near-infrared light area and an infrared light area in place of the two CCD cameras including the visible light compatible CCD camera 2A and the infrared light compatible CCD camera 2B.

As shown in FIG. 3, moreover, the infrared light irradiation lamp 10A is mainly constituted by a vessel-shaped lamp body 12, a front lens 14 assembled into the opening on the front surface of the lamp body 12 and forming a lighting chamber S in cooperation with the lamp body 12, a parabolic reflector 16 accommodated in the lighting chamber S and capable of adjusting a tilt by an aiming mechanism (not shown), a tungsten halogen bulb 20 to be a light source inserted and attached into a bulb insertion attachment hole 13 provided in the rear top portion of the reflector 16 through a bulb holder 60, and a globe 30 for infrared light formation which is provided to surround the bulb 20.

The globe 30 for infrared light formation is provided cylindrically to entirely cover the bulb 20 and an infrared light transmission multilayer film for shielding a visible light and transmitting only an infrared light is provided in the whole area of the outer peripheral surface of a cylindrical globe body formed of glass. Accordingly, when the bulb 20 is turned on, lights L1 and L2 emitted from a filament 22 toward the reflector 16 are transmitted through the globe 30, and the visible light is shielded by (the infrared light transmission multilayer film of) the globe 30 and only the infrared light can be transmitted through (the infrared light transmission multilayer film of) the globe 30. Consequently, the infrared light guided to the reflector 16 is reflected as shown in the arrows L1 and L2 in FIG. 3, is transmitted through the front lens 14 and is distributed forward as a light which is almost parallel with an optical axis L of the lamp.

Moreover, a fish-eye step 17 to be a diffusion step is provided to surround the bulb insertion attachment hole 13 in a peripheral region 16a of the light source in the reflector 16 which is ring-shaped as seen from a front as shown in FIGS. 4(a) and 4(b), and a red light component transmitted through the globe 30 for infrared light formation and guided to the peripheral region 16a of the light source in the reflector is diffused and reflected by the fish-eye step 17 as shown in an arrow of FIG. 4(a). An arrow L2 in FIG. 3 indicates the direction of the red light component diffused and reflected by the peripheral region 16a of the light source (fish-eye step 17) in the reflector 16 and the diffusion and the reflection are carried out within a range from an arrow L21 to an arrow L22 in FIG. 4(a).

More specifically, the red light component of the visible light which cannot be completely cut by the globe 30 for infrared light formation (the visible light transmitted through the globe 30 for infrared light formation) is reflected by the whole reflector 16 and is emitted from the front lens 14. A light reflected by the peripheral region 16a of the light source in the reflector 16 and emitted from the vicinity 14a of the central part of the front lens (a ring-shaped region seen from a front) corresponding to the peripheral region 16a of the light source has the highest energy (luminous flux density). For this reason, conventionally, there has been a problem in that the vicinity 14a of the central part of the front lens (the region corresponding to the peripheral region 16a of the light source in the reflector) emits a light as seen like a red ring and is erroneously recognized as a tail lamp or a stop lamp. In the embodiment, when the red light component of the visible light transmitted through the globe 30 for infrared light formation and guided to the peripheral region 16a of the light source in the reflector is to be reflected by (the light source peripheral region 16a of) the reflector, it is diffused and reflected by the fish-eye step 17 as shown in the reference numerals L21 and L22 and is transmitted (emitted) as a diffused light through the front lens 14. For this reason, the luminous flux density of the red light component distributed forward from the region 14a in the central part of the front lens is decreased so that the degree of red light emission of the lamp is reduced. Thus, the red light component L2 (L21, L22) of the visible light distributed from the vicinity of the central part of the front lens 14 have luminous flux densities reduced as the diffused lights. Therefore, the lamp is not seen to emit a red light.

Moreover, the globe 30 is supported by a slider 72 of an actuator 70 fixed to the lower end of the reflector 16, and the rear end of the globe 30 is provided apart from the reflector 16. More specifically, a clearance 31 is formed between the globe 30 and the reflector 16. Consequently, when a part of the light emission of the filament 22 to be the light emitting portion of the bulb is guided to the peripheral region 16a of the light source in the reflector 16 through the clearance 31 without transmission through the globe 30 and is reflected therein as shown in the reference numeral L3 of FIG. 4(a), it is diffused and reflected by the fish-eye step 17 as shown in the reference numerals L31 and L32 and is transmitted (emitted) as a white diffused light through the front lens 14. For this reason, since the red light component distributed forward from the region 14a in the central part of the front lens has a luminous flux density reduced and is diluted with the white diffused light, the lamp is not seen to emit a red light at all.

The bulb holder 60 is constituted by metal having a high thermal conductivity with such a structure that a disc-shaped radiation fin 68 is integrated with a cylindrical portion 61 which can be engaged with the bulb insertion attachment hole 13. The cylindrical portion 61 has such a size as to be engaged with a mouse piece 21 of the bulb 20, and the tip of the cylindrical portion 61 is extended to the vicinal position of the filament 22 to be the light emitting portion of the bulb 20 in such a configuration that the bulb holder 60 is engaged with the bulb insertion attachment hole 13. Therefore, heat generated by turning on the bulb 20 (filament 22) is transferred to the radiation fin 68 extended along the back face of the reflector 16 from the cylindrical portion 61 of the bulb holder 60 extended into the globe 30 and is radiated into a space on the back of the reflector 16 so that the inside of the globe 30 is not filled with the heat.

Moreover, a clearance 32 communicating with the clearance 31 is provided between the cylindrical portion 61 and the globe 30, and an air convection is generated across the inside and outside of the globe 30 through the clearances 31 and 32 and heat in the globe 30 is radiated out of the globe 30 as shown in a white arrow of FIG. 4(a).

Furthermore, a light shielding portion 26 referred to as a black top is provided in the tip portion of the glass bulb of the bulb 20 and serves to shield a direct light (a visible light and an infrared light) transmitted forward from the bulb 20, thereby impeding the generation of a glare light.

Moreover, there is a possibility that the infrared light might injure eyes of a person if it enters the eyes for a long period of time. By a lighting control circuit 100 (see FIG. 3) comprising a vehicle speed sensor 110 and a control portion 120 having a CPU 122 and a storage portion 124, therefore, the bulb 20 (lamp 10A) is turned on during only a running operation in which the infrared light does not injure the eyes, and the bulb 20 (lamp 10A) is automatically turned off at a predetermined speed V0 or less at which a vehicle speed V approximates to zero at time of stoppage in which the infrared light might injure the eyes.

More specifically, a vehicle speed condition for outputting a stop signal to stop the turn on of the bulb 20 (lamp 10A) is previously input and set to the storage portion 124 of the control portion 120. When the CPU 122 decides that the vehicle speed V is set to be the predetermined speed V0 or less which approximates to zero in response to an output from the vehicle speed sensor 110, it outputs a stop signal for turning OFF a bulb turn-on switch Sw. Consequently, the bulb turn-on switch Sw is turned OFF so that the supply of a current to the bulb 20 is stopped and the bulb 20 (lamp 10A) is thereby turned off.

Furthermore, the infrared light irradiation lamp 10 according to the example has the globe 30 for infrared light formation fixed to the slider 72 of the longitudinally slidable actuator 70 to be the globe moving mechanism through an annular globe holder 50 and also functions as a lamp for running (beam formation) of a headlamp.

More specifically, if the globe 30 for infrared light formation which covers the bulb 20 is placed in a position shown in a solid line of FIG. 3, the light (white light) emitted from the bulb 20 is transmitted through the globe 30 and is changed into an infrared light, and the infrared light is reflected by the reflector 16 and is emitted from the front lens 14 so that the globe 30 functions as an infrared light irradiation lamp.

On the other hand, when the globe 30 for infrared light formation is moved to a position shown in a virtual line of FIG. 3 to release the peripheral portion of the bulb 20 by the actuator 70, the light (white light) emitted from the bulb 20 is not transmitted through the globe 30 but is guided to the whole reflector 16 so that a main beam is formed. The lamp function is switched by a light distribution change-over switch 112 of the headlamp. By manipulating the switch 112, the actuator 70 is operated. In the case in which the light distribution of the headlamp is changed into the main beam, the globe 30 is moved forward so that only a visible light is distributed.

Moreover, the reference numeral 130 denotes a power converting circuit to be power regulating means constituted by a chopper circuit provided in a power supply path to the bulb 20 which is not operated but exactly supplies the power of a battery to the bulb when it is used as the lamp for running (beam formation), and is operated (causes the supplied power to take the shape of a rectangular wave) to convert the power to a predetermined proper power (for example, 12V) to be supplied to the bulb 20 only when it is used as the infrared light irradiation lamp and the power supplied from the battery exceeds a predetermined value (for example, 13V).

More specifically, a power having an exact battery voltage is supplied to form a main beam in a sufficient amount of a light at time of main beam irradiation in which a portion provided around the bulb is released and the globe 30 for infrared light formation and the bulb 20 themselves are not exposed to a high temperature. On the other hand, at time of infrared light irradiation in which the bulb 20 is covered with the globe 30 and the inside of the globe 30 is filled with heat so that the globe 30 and the bulb 20 themselves might be exposed to a high temperature, when the battery voltage does not exceed a predetermined value (for example, 12V), the amount of the heat generated from the bulb 20 is not greatly increased. In the same manner as the case of the main beam irradiation, therefore, a power having an exact battery voltage is supplied to the bulb 20 to form an infrared beam in a sufficient amount of a light so that a night forward field-of-view detecting system using a CCD camera can easily carry out the detection. However, in the case in which the battery voltage exceeds the predetermined value (for example, 12V) during the infrared light irradiation, a power (for example, a power of 12V) regulated by the power converting circuit 130 is supplied such that the amount of the heat generated from the bulb 20 is not increased. Thus, the temperature in the globe 30 can be prevented from being increased.

FIGS. 5(*a*) and (*b*) show a specific example of the power converting circuit to be the power regulating means. (a) comprises a step-down circuit constituted by a resistor R and (b) comprises a step-down chopper circuit constituted by a transistor TR to be a switching element, a diode D and an inductor L. In both of FIGS. 5(*a*) and (*b*), a switch SW is operated toward the terminal A side so that the power of a battery is exactly supplied to the bulb 20 at time of a main beam. At time of infrared light irradiation, moreover, the switch SW is operated toward the terminal B side so that the voltage of the battery is dropped to a proper voltage by the resistor R or the step-down chopper circuit and is thus supplied to the bulb 20. In place of the resistor R in the power converting circuit shown in FIG. 5(*a*), it is also possible to employ such a structure that a power to be supplied to the bulb 20 should be regulated by changing the thickness or length of a feeding cord (conductor) between the battery and the bulb 20.

FIG. 6 shows a processing flow of the control portion 120 (CPU 122) of the lighting control circuit 100. This routine is started on the premise that a headlamp (a low beam or a main beam) is set in a turn on state.

First of all, at a step S10, it is decided whether or not the turn on of the headlamp is the low beam based on a signal sent from the light distribution change-over switch 112. If the decision is YES (low beam turn on) at the step S10, the process proceeds to a step S11 in which it is decided whether or not a switch for operating a main beam night forward field-of-view detecting system is ON. While the system operating switch is pressed as a manual switch when a driver drives while watching an image on the head up display 6, it may be constituted to be turned ON interlockingly with the turn on of the low beam.

Then, if the decision is YES at the step S11 (the night forward field-of-view detecting system operating switch is ON), it is decided whether or not a battery voltage is equal to or higher than 13V at a step S11A. If the decision is YES (the battery voltage is equal to or higher than 13V), the process proceeds to a step S11B in which a signal for setting the power converting circuit 130 into an operation state is output and the process then proceeds to a step S12. On the other hand, if the decision is NO (the battery voltage is lower than 13V) in the step S11A, the process proceeds to a step S11C in which a signal for setting the power converting circuit 130 into a stop state is output and the process then proceeds to the step S12. At the step S12, it is decided whether or not a vehicle speed V is equal to or lower than a predetermined value (V0) which approximates to zero based on the output of the vehicle speed sensor 110. If the decision is NO (V>V0) at the step S12, the process proceeds to a step S13 in which an output is sent to turn ON the bulb 20, and then returns to the step S10.

On the other hand, if the decision is NO (main beam turn on) at the step S10, the process proceeds to a step S15 in which an actuator driving signal is output to move the globe 30 forward. At a step S16, an output is sent to turn on the bulb 20. Consequently, a main beam is obtained by only a visible light.

Moreover, if the decision is NO at the step S11 (the night forward field-of-view detecting system operating switch is not ON) or the decision is YES at the step S12 (V≦V0), an output is sent to turn off the lighted bulb (the infrared light irradiation lamp 10A) and the process then returns to the step S10.

In the example, only when the battery voltage exceeds the predetermined value (for example, 13V) in the use as the infrared light irradiation lamp (at time of infrared light irradiation) as shown in the steps S11A, S11B and S11C in FIG. 6, the power converting circuit 130 is operated to obtain a predetermined proper power (for example, 12V) by a conversion, thereby supplying the same power to the bulb 20. In the use as the infrared light irradiation lamp (at time of the infrared light irradiation), the power converting circuit 130 may be operated to reduce the power to be supplied to the bulb 20 (to a predetermined value, for example, 11V) irrespective of the value of the battery voltage. In the processing flow of the control portion 120 (CPU 122) of the lighting control circuit 100 in this case, the steps S11A and S11C in the flow shown in FIG. 6 may be eliminated to directly proceed from the step S11 to the step S11B.

Moreover, while the fish-eye step 17 is provided in the peripheral edge portion of the bulb insertion attachment hole of the reflector 16 in order to suppress red light emission when the infrared light irradiation lamp is turned on in the example, the fish-eye step 17 may be provided on the back side in the central region of the front lens 14 corresponding to the peripheral edge portion of the bulb insertion attachment hole. Furthermore, the step in which the reflector 16 and the front lens 14 are provided may be a cylindrical step or another diffusion step in place of the fish-eye step 17.

As is apparent from the description, according to the first aspect of the invention, the globe for infrared light formation is placed in such a position as to cover the light source and the inside of the globe is apt to be filled with the heat generated from the light source in the infrared light irradiation configuration. However, the amount of the heat generated from the light source is smaller than the amount of heat generated from the light source in the visible light irradiation configuration. Therefore, the temperature in the globe can be prevented from being increased. First of all, therefore, the lifetime of the bulb can be prolonged. Secondly, a thermal degradation in the infrared light transmission multilayer film provided in the globe is suppressed. Therefore, it is possible to provide an infrared light irradiation lamp in which the infrared light transmittance of the globe is guaranteed to be constant for a long period of time and the amount of light irradiation is stable for a long period of time.

According to the second aspect of the invention, in the case in which the amount of the heat generated from the light source is not so large in the infrared light irradiation configuration (the case in which there is no possibility that the visible light cut and infrared ray transmission characteristic of the globe and the lifetime of the light source might be adversely influenced), a power having a source voltage is exactly supplied to the light source so that an infrared beam is formed in a sufficient amount of a light in the same manner as in the visible light irradiation configuration. Therefore, the pictures of a pedestrian and an obstacle on the display of the night forward field-of-view detecting system become clear so that a visibility in the forward region of a vehicle can be enhanced and stable running can be maintained.

According to the third aspect of the invention, the inside of the globe is not filled with heat and an increase in a temperature in the light source and the globe for infrared light formation can be prevented still more so that the lifetime of the light source can be further prolonged, and furthermore, a thermal degradation in the infrared light transmission multilayer film provided in the globe can be suppressed still more by the heat radiating function of an air convection formed across the inside and outside of the globe for infrared light formation. Therefore, it is possible to provide an infrared light irradiation lamp in which the infrared light transmittance of the globe is guaranteed to be constant for a long period of time and the amount of light irradiation is stabilized for a long period of time.

What is claimed is:

1. An infrared light irradiation lamp for an automobile comprising;
   a lighting chamber formed by a lamp body and a front lens;
   a reflector provided in the lamp body;
   a light source provided ahead of the reflector;
   a cylindrical globe for infrared light formation provided to cover the light source and serving to shield a visible light and to transmit only an infrared light, and
   a globe moving mechanism for moving the globe, the globe moving mechanism being capable of switching a lamp function into an infrared light irradiation configuration in which the globe for infrared light formation covers the light source and a visible light irradiation configuration in which the globe for infrared light formation is moved forward from the light source,
   wherein power regulating means is provided on a power supply path reaching the light source and a power supplied from the light source to the infrared light irradiation configuration is regulated to be lower than a power supplied from the light source to the visible light irradiation configuration.

2. The infrared light irradiation lamp for an automobile according to claim 1, wherein a source voltage is directly supplied to the light source.

3. The infrared light irradiation lamp for an automobile according to claim 2, wherein said directly supplied source voltage is supplied in the case in which the power regulating means is not operated and the power regulating means has the lamp function in the infrared light irradiation configuration and drops the power supplied from the light source when the source voltage exceeds a predetermined value.

4. The infrared light irradiation lamp for an automobile according to claim 3, wherein the globe for infrared light formation in the infrared light irradiation configuration has a rear end provided apart from the reflector.

5. The infrared light irradiation lamp for an automobile according to claim 2, wherein the globe for infrared light formation in the infrared light irradiation configuration has a rear end provided apart from the reflector.

6. The infrared light irradiation lamp for an automobile according to claim 1, wherein the globe for infrared light formation in the infrared light irradiation configuration has a rear end provided apart from the reflector.

7. The infrared light irradiation lamp for an automobile according to claim 1, wherein an infrared light irradiation configuration is automatically prohibited at a vehicle speed lower than a predetermined value.

8. The infrared light irradiation lamp for an automobile according to claim 1, wherein said power supplied from the light source to the infrared light irradiation configuration is regulated only when a power supplied from the battery exceeds a predetermined value.

9. The infrared light irradiation lamp for an automobile according to claim 1, wherein said power regulating means is a step-down voltage circuit having a resistor.

10. The infrared light irradiation lamp for an automobile according to claim 1, wherein said power regulating means is a step-down chopper circuit which is comprised of a switching element, a diode and an inductor.

* * * * *